United States Patent
Ness et al.

(10) Patent No.: US 10,400,663 B2
(45) Date of Patent: Sep. 3, 2019

(54) PISTON BOWL FOR IMPROVED COMBUSTION STABILITY

(71) Applicant: Caterpillar Inc., Peoria, IL (US)

(72) Inventors: Aaron Ness, Battle Ground, IN (US); Jeff Howard, West Lafayette, IN (US); Sri Harsha Uddanda, Lafayette, IN (US); Lucas Allen Burger, Oshkosh, WI (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/844,876

(22) Filed: Dec. 18, 2017

(65) Prior Publication Data

US 2019/0186341 A1   Jun. 20, 2019

(51) Int. Cl.
*F02F 3/28* (2006.01)
*F02B 23/06* (2006.01)

(52) U.S. Cl.
CPC ...... *F02B 23/0621* (2013.01); *F02B 23/0672* (2013.01); *F02F 3/28* (2013.01)

(58) Field of Classification Search
CPC ...... F02B 23/0621; F02B 23/0672; F02F 3/28
USPC ....................................................... 123/193.6
See application file for complete search history.

(56) References Cited

U.S. PATENT DOCUMENTS

| | | | |
|---|---|---|---|
| 5,660,156 A * | 8/1997 | Whitacre | B22D 19/0027 123/193.6 |
| 8,677,970 B2 | 3/2014 | Venugopal et al. | |
| 9,097,202 B2 | 8/2015 | He et al. | |
| 9,228,531 B2 | 1/2016 | Ness et al. | |
| 9,238,996 B2 | 1/2016 | Easley et al. | |
| 9,429,101 B2 | 8/2016 | Nacke et al. | |
| 9,470,311 B2 | 10/2016 | Lapp | |
| 2007/0199538 A1 * | 8/2007 | Yuzaki | F02B 23/0651 123/276 |
| 2010/0263620 A1 * | 10/2010 | Sadowski | F02F 3/22 123/193.6 |
| 2011/0146613 A1 * | 6/2011 | Oxborrow | F02B 23/0621 123/193.6 |
| 2014/0238232 A1 * | 8/2014 | Lapp | B23K 26/28 92/172 |
| 2016/0138461 A1 * | 5/2016 | Ono | F02F 3/22 123/294 |
| 2016/0169152 A1 | 6/2016 | Burger et al. | |
| 2016/0169153 A1 | 6/2016 | Burger et al. | |
| 2016/0177865 A1 * | 6/2016 | Weinenger | B23P 15/10 123/193.6 |
| 2016/0186686 A1 | 6/2016 | Azevedo et al. | |

FOREIGN PATENT DOCUMENTS

WO   WO-2009077506 A1 *  6/2009   .......... F02B 23/0672

* cited by examiner

*Primary Examiner* — Marguerite J McMahon
(74) *Attorney, Agent, or Firm* — Law Office of Kurt J. Fugman LLC

(57) ABSTRACT

A piston comprises a crown portion with a contoured bowl having a reentrant surface extending from the top squish surface that connects to a lower sidewall surface that connects to a swirl pocket surface disposed adjacent the bottom bowl surface.

16 Claims, 4 Drawing Sheets

PISTON BOWL FOR IMPROVED COMBUSTION STABILITY

TECHNICAL FIELD

The present disclosure relates generally to pistons that are used in internal combustion engines having a contoured piston bowl geometry. More specifically, the present disclosure relates to a piston having a contoured piston bowl geometry for improved combustion stability that may be used in spark ignition engines such as gas engines and the like.

BACKGROUND

Internal combustion engines are routinely used in various industries to power machines and equipment. Examples of industries using such machines and equipment include marine, earth moving, construction, mining, locomotive and agriculture industries, etc. In certain markets and market segments, a gas engine with high specific output, high efficiency, and good combustion stability is needed. Current engines are often unable to meet the desired performance requirements.

U.S. Pat. No. 9,471,311 to Lapp illustrates a piston with a contoured piston bowl geometry. However, the focus of the patent does not concern specific output, high efficiency, and good combustion stability. More specifically, the contoured piston bowl geometry is not taught to improve any of these performances. Instead, as shown by the abstract of Lapp, this patent is directed to reducing the weight of the power cell assembly. More specifically, an exemplary power cell assembly of Lapp may include a piston crown and connecting rod. In an exemplary illustration, a power cell assembly includes a piston crown having a ring land extending circumferentially about a combustion bowl. The boss portions may each include inwardly extending shoulders defining arcuate crown running surfaces. The power cell assembly may further include a connecting rod having a shank and an upper end received in a cavity of the crown. The upper end of the connecting rod may define arcuate connecting rod running surfaces extending away from the shank. The crown running surfaces and connecting rod running surfaces generally allow the connecting rod to pivot with respect to the piston crown about an axis of rotation that extends from one of the boss portions to the other of the boss portions.

As can be seen, the piston design of Lapp does not address some of the current market demands such as having high specific output, high efficiency, and good combustion stability. Accordingly, it is desirable to develop a piston that allows an engine using that piston riding in a bore of that engine to have a high specific output, high efficiency, and good combustion stability.

SUMMARY OF THE DISCLOSURE

A piston configured to reciprocate in the bore of an engine may be provided according to an embodiment of the present disclosure comprising a body that includes a connecting rod attachment portion and a crown portion. The crown portion may include a generally cylindrical shape defining a cylindrical axis, circumferential direction, and a radial direction. The crown portion may further include a circular annular top squish surface with an outer circumference, a wall portion extending axially away from the squish surface defining a contoured bowl extending axially from the top squish surface toward the interior of the body, terminating at a bottom bowl surface. The wall portion may further define a cooling gallery extending axially from the bottom wall surface toward the top squish surface. The contoured bowl may include a symmetrical annular shape about the cylindrical axis and a reentrant surface extending from the top squish surface that connects to a lower conical surface that connects to a swirl pocket surface disposed adjacent the bottom bowl surface.

A piston configured to reciprocate in the bore of an engine may be provided according to another embodiment of the present disclosure comprising a body that includes a connecting rod attachment portion and a crown portion. The crown portion may include a generally cylindrical shape defining a cylindrical axis, circumferential direction, and a radial direction. The crown portion may further include a circular annular top squish surface with an outer circumference, a wall portion extending axially away from the squish surface proximate the outer circumference of the squish surface, defining a bottom wall surface. The crown portion may further define a contoured bowl extending axially from the top squish surface toward the interior of the body, terminating at a bottom bowl surface. The wall portion may further define a cooling gallery extending axially from the bottom wall surface toward the top squish surface. The contoured bowl may include a symmetrical annular shape about the cylindrical axis and a lower conical surface and the cooling gallery may include an outer conical surface disposed proximate the lower conical surface being parallel therewith.

DETAILED DESCRIPTION

Figure 1:
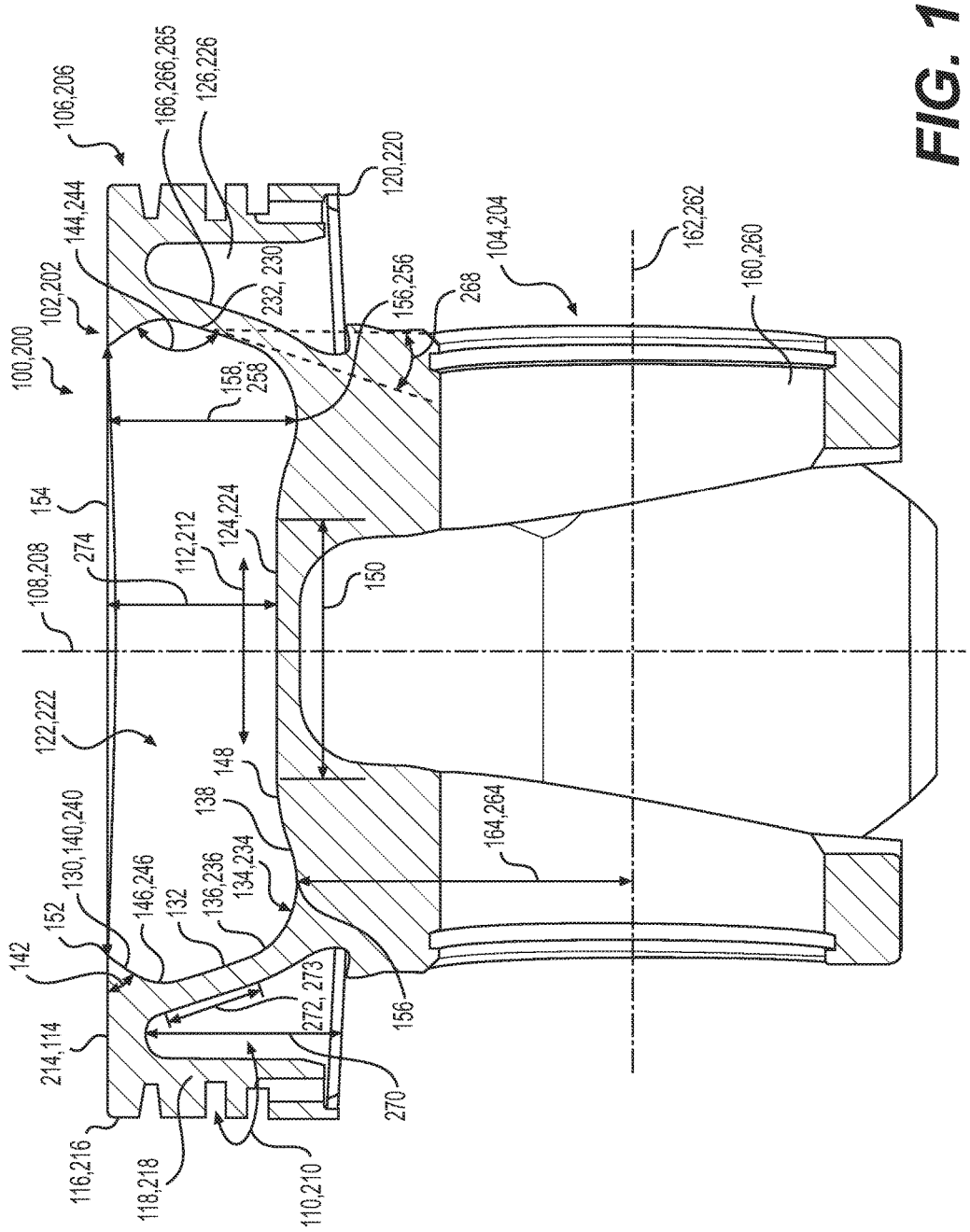
FIG. 1 is a cut-away side view of a piston having a contoured piston bowl geometry according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a piston that may be used in an internal combustion engine with a cooling gallery and piston bowl geometry according to the present disclosure will now be described. More particularly, these pistons may provide good combustion stability and/or a low compression ratio, allowing the engine to have a high specific output and a high efficiency.

Figure 2:
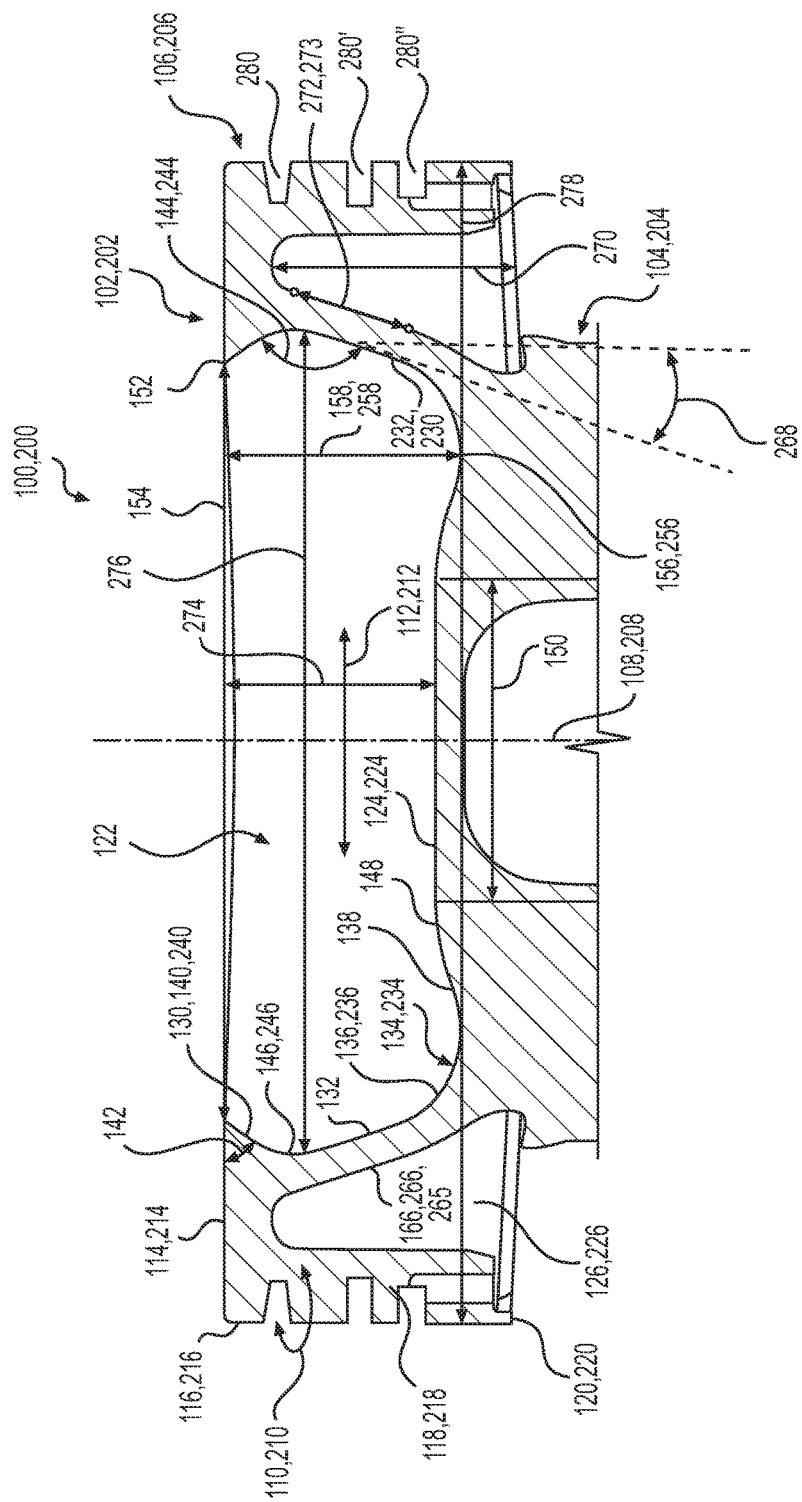
FIG. 2 an enlarged view of the crown portion of the piston of FIG. 1, showing the piston bowl geometry and cooling gallery geometry more clearly.
Figure 3:
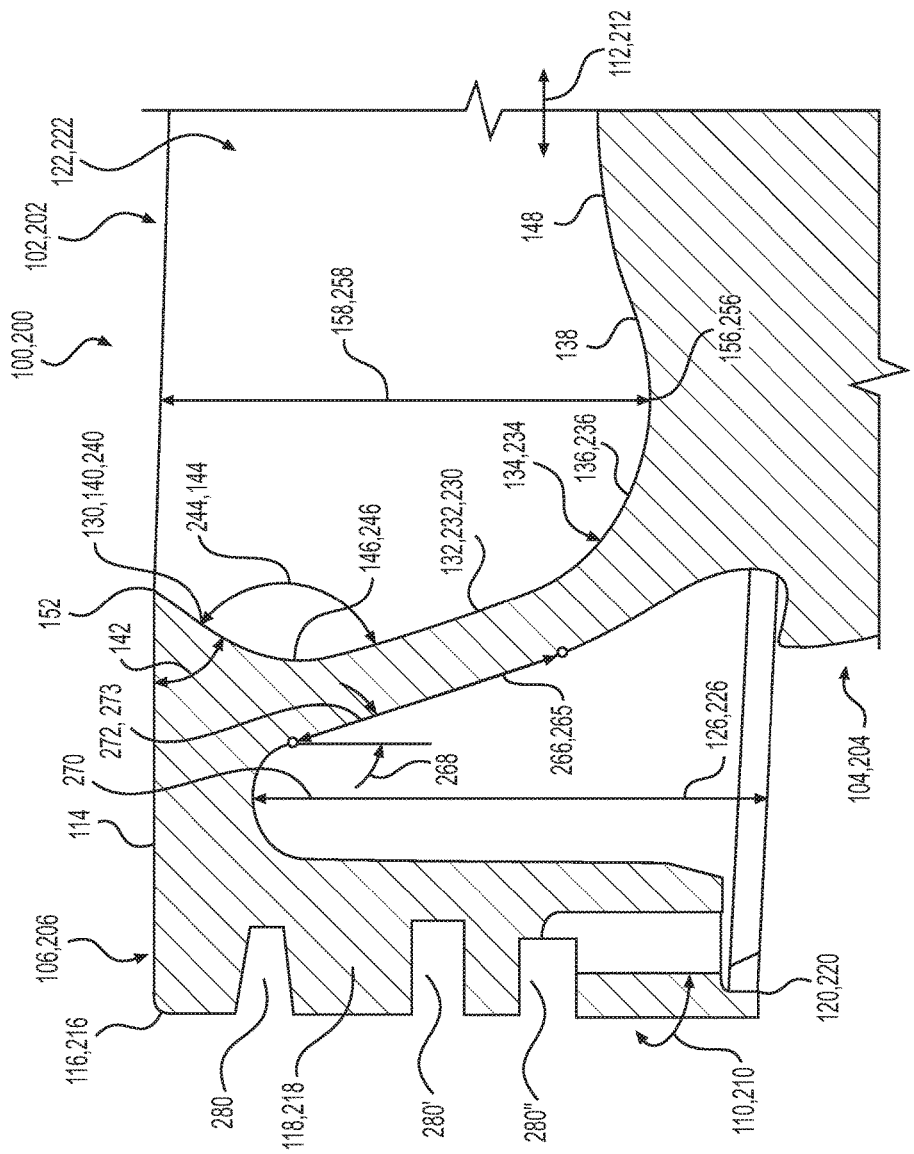
FIG. 3 is an enlarged view of the side wall and bottom corner of the piston bowl geometry of FIG. 2.

Looking at FIGS. 1 thru 3, a piston 100 that is configured to reciprocate in the bore (not shown) of an engine (not shown), such as an internal combustion engine is shown. Various features of the piston 100 may allow for good combustion stability according to an embodiment of the present disclosure.

The piston 100 may comprise a body 102 that includes a connecting rod attachment portion 104 and a crown portion 106. The crown portion 106 may include a generally cylindrical shape defining a cylindrical axis 108, circumferential direction 110 and a radial direction 112. This crown portion 106 may further include a circular annular top squish surface 114 with an outer circumference 116 and a wall portion 118 extending axially away from the squish surface 114 proximate the outer circumference 116 of the squish surface 114. The wall portion 118 may define a bottom wall surface 120.

Also, the crown portion 106 may further define a contoured bowl 122 extending axially from the top squish surface 114 toward the interior of the body 102, terminating at a bottom bowl surface 124. This contoured bowl 122 may be centered in the crown portion 106 and the wall portion 118 may extend circumferentially about the contoured bowl 122. The wall portion 118 may further define a cooling gallery 126 extending axially from the bottom wall surface 120 toward the top squish surface 114 and this cooling gallery 126 may extend circumferentially in an annular manner about the contoured bowl.

The contoured bowl 122 may include a symmetrical annular shape about the cylindrical axis 108 and may further include a reentrant surface 130 extending from the top squish surface 114 that connects to a lower conical surface 132. This lower conical surface 132 may connect to a swirl pocket surface 134 disposed adjacent the bottom bowl surface 124.

A "reentrant" surface 130 is to be understood to include any surface that forms an undercut along the axial direction 108 of the crown portion 106 and is typically disposed proximate to and extending from the squish surface 114. The reentrant surface 130 may aid in creating a swirling effect of the fuel and air mixture during a combustion cycle of the engine, helping to provide good combustion stability.

Similarly, the swirl pocket surface 134 disposed at the bottom of the contoured bowl 122 may also provide a swirling effect of the fuel and air mixture during a combustion cycle of the engine, also helping to provide good combustion stability. The swirl pocket surface 134 may include an arcuate portion 136 and a bottom angled surface 138 that connects the arcuate portion 136 of the swirl pocket surface 134 to the bottom bowl surface 124. For the embodiment shown, the bottom bowl surface 124 is flat and is perpendicular to the cylindrical axis 108. Other configurations are possible.

As used herein, "arcuate" includes any shape that is not straight including radial, elliptical, polynomial, etc. The term "blend" may also be similarly understood.

For, the embodiment shown in FIGS. 1 thru 3, the reentrant surface 130 is a conical reentrant surface 140 or nearly conical reentrant surface. The conical reentrant surface 140 may form an included reentrant angle 142 with the top squish surface 114 ranging from 45 to 80 degrees. Likewise, the conical reentrant surface 140 and the lower conical surface 132 form a sidewall and a sidewall angle 144 between the conical reentrant surface 130, 140, 240 and the lower conical surface 132 ranging from 110 to 140 degrees.

The contoured bowl 122 may further include a top blend 146 transitioning from the conical reentrant surface 140 to the lower conical surface 132 and a bottom blend 148 transitioning from the bottom angled surface 138 to the bottom bowl surface 124. In some embodiments, the bottom angled surface 138 may be omitted such that the arcuate portion 136 of the swirl pocket surface 134, which is shown to take the form of a concave radius, may transition directly to the bottom blend 148, which is shown to take the form of a convex radius. The blends 146, 148 may have other configurations other than radial.

For the embodiment shown in FIGS. 1 thru 3, the bottom bowl surface 124 has a circular shape defining a bottom bowl surface diameter 150 and the conical reentrant surface 140 forms a circular intersection 152 with the top squish surface 114. This circular intersection 152 defines a circular intersection diameter 154 and a ratio of the circular intersection diameter 154 to the bottom bowl surface diameter 150 ranges from 1.75 to 3.5. The bottom bowl surface 124 may be flat and perpendicular to the cylindrical axis 108 and the swirl pocket surface 134 may include an arcuate portion 136 that defines a lower axial extremity 156 that is disposed axially below relative to the bottom bowl surface 124. The bottom bowl surface 124 and the intersection 152 between the squish surface 114 and the reentrant surface 130 may be varied as needed or desired in other embodiments.

Focusing now on FIG. 1, the body 102 of the piston 100 may define a first axial distance 158 from the top squish surface 114 to the lower axial extremity 156. Also, the connecting rod attachment portion 104 may define a cylindrical aperture 160 defining a connecting rod pivot axis 162 that is perpendicular to the cylindrical axis 108 of the crown portion 106. The body 102 may further define a second axial distance 164 from the lower axial extremity 156 of the arcuate portion 136 to the pivot axis 162, and a ratio of the second axial distance 164 to the first axial distance 158 may range from 1.25 to 2.5.

Looking at the cooling gallery 126, the body 102 of the piston 100 may include an outer conical surface 166, which partially defines the cooling gallery 126. This outer conical surface 166 may be disposed adjacent the lower conical surface 132 of the contoured bowl 122 and may be parallel therewith. This geometrical relationship between the cooling gallery and the contoured bowl may allow the volume of the bowl to be maximized, increasing power output and decreasing the compression ratio slightly, etc.

Next, a piston configured to reciprocate in the bore of an engine that may provide an increase in the power output and lower compression ratio will be described with reference to FIGS. 1 thru 3.

Such a piston 200 may comprise a body 202 that includes a connecting rod attachment portion 204 and a crown portion 206. As mentioned previously, the crown portion 206 may include a generally cylindrical shape defining a cylindrical axis 208, a circumferential direction 210 and a radial direction 212. The crown portion 206 may further include a circular annular top squish surface 214 with an outer circumference 216, a wall portion 218 extending axially away from the squish surface 214 proximate the outer circumference 216 of the squish surface 214, defining a bottom wall surface 220. The crown portion 206 may further define a contoured bowl 222 extending axially from the top squish surface 214 toward the interior of the body 202, terminating at a bottom bowl surface 224. The wall portion 218 may further define a cooling gallery 226 extending axially from the bottom wall surface 220 toward the top squish surface 214.

For this embodiment, the contoured bowl 222 includes a symmetrical annular shape about the cylindrical axis 208 and further includes a lower conical surface 232 and the cooling gallery 226 includes an outer conical surface 266 disposed proximate the lower conical surface 232 being parallel therewith. The lower sidewall surface 230, such as lower conical surface 232, may form an acute angle 268 with the cylindrical axis 208 ranging from 0 to 30 degrees. Any angle over zero degrees would make this surface a lower conical surface.

The cooling gallery 226 may define a cooling gallery height 270 along a direction parallel with the cylindrical axis 208. Also, the cooling gallery sidewall surface 265, such as outer conical surface 266, may define an outer conical surface curvilinear length 272 (may also be referred to as a cooling gallery sidewall surface curvilinear length 273), and a ratio of the height 270 of the cooling gallery 226 to the cooling gallery sidewall curvilinear length 272, 273 ranges from 1.0 to 1.9.

As previously mentioned herein, the contoured bowl 222 may include a conical reentrant surface 240 extending from the top squish surface 214, forming an angle 244 with the lower conical surface 232 ranging from 110 to 140 degrees.

Furthermore, the contoured bowl 222 may include a swirl pocket surface 234 disposed adjacent the bottom bowl surface 224 that connects the lower conical surface 232 to the bottom bowl surface 224. Again, the bottom bowl surface 224 may be flat and may have a circular configuration. This may help maximize the volume of the bowl, increasing the power output of the engine.

Looking more closely at the swirl pocket, the swirl pocket surface 234 may include a concave arcuate portion 236 defining a lower axial extremity 256 disposed axially below relative to the bottom bowl surface 224. This may help to maximize the volume of the bowl while also aid in good combustion stability may providing a swirling effect that may improve the dispersion of fuel in the fuel and air mixture during the combustion cycle of the engine.

The body 202 may define a first axial distance 256 from the top squish surface 214 to the lower axial extremity 256 and the connecting rod attachment portion 204 may define a cylindrical aperture 260 defining a connecting rod pivot axis 262 that is perpendicular to the cylindrical axis 208 of the crown portion 206. In like fashion, the body 202 may further define a second axial distance 266 from the lower extremity 256 of the concave arcuate portion 236 to the pivot axis 262, and a ratio of the second axial distance 264 to the first axial distance 258 ranges from 1.25 to 2.5. The body 202 may also define a third axial distance 274 from the top squish surface 214 to the bottom bowl surface 224 and a ratio of the first axial distance 258 to the third axial distance 274 may range from 1.0 to 1.4.

As mentioned earlier herein, the body may further include a blend 246 joining the reentrant conical surface 240 to the lower conical surface 232. Since this blend 246 defines the radial extremity of the bowl 222, the blend 246 also defines a maximum diameter 276 (see FIG. 2) of the bowl 222 at this blend surface, and the ratio of the maximum diameter 276 to the first axial distance 258 ranges from 2.75 to 5.0. The crown portion 206 may define a crown diameter 278 (see FIG. 2) at the outer circumference 216 of the top squish surface 214 and a ratio of the crown diameter 278 to the maximum diameter 276 of the bowl 222 may range from 1.3 to 1.8.

For any of the embodiments discussed herein, many of the features of the crown portion 104, 204 all share the same cylindrical axis 108, 208 including the cooling gallery 126, 226, contoured bowl 122, 222, piston ring grooves 280 on the wall portion 118, 218, the wall portion itself, etc. In many embodiments, these features are symmetrical about the axis 108, 208. This may not be true for other embodiments.

The piston may be fabricated from steel, cast aluminum alloy, forged aluminum alloy or other suitable material that is durable, corrosion resistant, etc. The geometry of the cooling gallery may be formed during the casting or forging process and then may be rough machined and/or finish machined if necessary. Suitable machining processes may include milling, turning, electrical discharge machining, etc.

INDUSTRIAL APPLICABILITY

In practice, a piston, a crown portion of a piston, and/or an engine assembly using such a piston or crown portion of a piston according to any embodiment described herein may be provided, sold, manufactured, and bought etc. as needed or desired in an aftermarket or OEM context. For example, a crown portion or a piston may be used to retrofit an existing engine already in the field or may be sold with an engine or a piece of equipment using that engine at the first point of sale of the piece of equipment.

Figure 4:
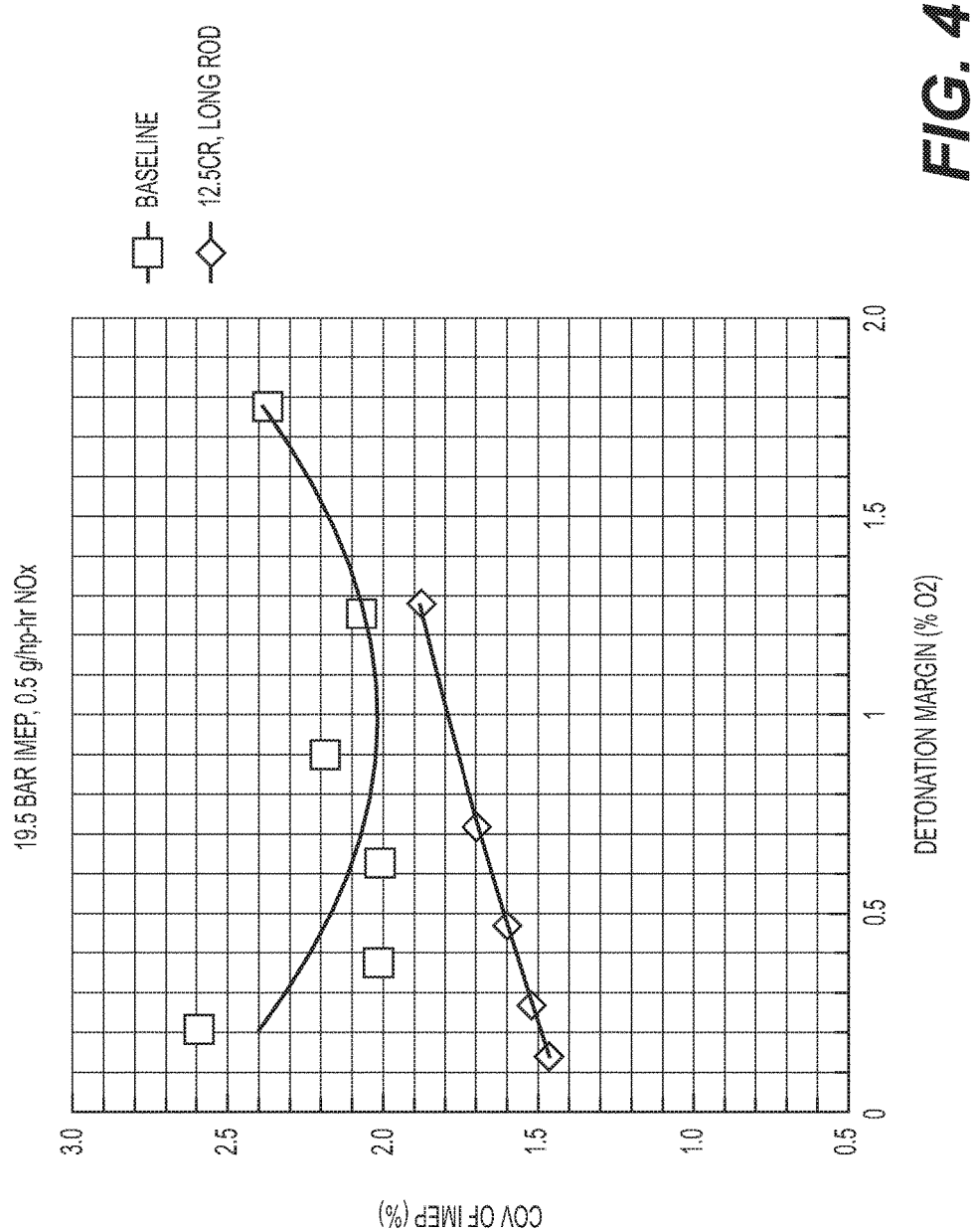
FIG. 4 is a graph showing the improvement of combustion stability (expressed as COV of IMEP) using embodiments of a piston of the present disclosure over baseline values for a piston not constructed according to embodiments of the present disclosure.

Improvements in such an engine may include the following as verified through testing. More specifically, FIG. 4 contains test data that indicates that piston geometry used with a long connecting rod (12.5CR, Long Rod) had an improvement in combustion stability (expressed as COV of IMEP) over the baseline piston geometry.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A piston configured to reciprocate in the bore of an engine, the piston comprising:
   a body that includes a connecting rod attachment portion and a crown portion;
   the crown portion includes a generally cylindrical shape defining a cylindrical axis, circumferential direction and a radial direction, the crown portion further including a circular annular top squish surface with an outer circumference, a wall portion extending axially away from the squish surface proximate the outer circumference of the squish surface defining a bottom wall surface, the crown portion further defining a contoured bowl extending axially from the top squish surface toward the interior of the body, terminating at a bottom bowl surface and the wall portion further defining a cooling gallery extending axially from the bottom wall surface toward the top squish surface;
   wherein the contoured bowl includes a symmetrical annular shape about the cylindrical axis and further includes a reentrant surface extending from the top squish surface that connects to a lower sidewall surface that connects to a swirl pocket surface disposed adjacent the bottom bowl surface;
   the swirl pocket surface includes an arcuate portion and a bottom angled surface that connects the arcuate portion of the swirl pocket surface to the bottom bowl surface and the bottom bowl surface is flat and is perpendicular to the cylindrical axis; and
   the reentrant surface is a conical reentrant surface that forms an included reentrant angle with the top squish surface ranging from 45 to 80 degrees and the conical reentrant surface and lower sidewall surface form a sidewall and a sidewall angle between the conical reentrant surface and the lower sidewall surface ranging from 110 to 140 degrees.

2. The piston of claim 1, wherein the lower sidewall surface is a lower conical surface and the contoured bowl further includes a top blend transitioning from the conical reentrant surface to the lower conical surface.

3. The piston of claim 2, wherein the contoured bowl further includes a bottom blend transitioning from the bottom angled surface to the bottom bowl surface.

4. The piston of claim 3, wherein the bottom bowl surface has a circular shape defining a bottom bowl surface diameter and the conical reentrant surface forms a circular intersection with the top squish surface, the circular intersection defining a circular intersection diameter and a ratio of the circular intersection diameter to the bottom bowl surface diameter ranges from 1.75 to 3.50.

5. The piston of claim 1, wherein the bottom bowl surface is flat and perpendicular to the cylindrical axis and the swirl pocket surface includes an arcuate portion that defines a lower axial extremity that is disposed axially below relative to the bottom bowl surface.

6. The piston of claim 5, wherein the body defines a first axial distance from the top squish surface to the lower axial extremity, the connecting rod attachment portion defines a cylindrical aperture defining a connecting rod pivot axis that is perpendicular to the cylindrical axis of the crown portion, the body further defines a second axial distance from the lower axial extremity of the arcuate portion to the pivot axis, and a ratio of the second axial distance to the first axial distance ranges from 1.25 to 2.5.

7. The piston of claim 1, wherein the body includes a cooling gallery sidewall surface, partially defining the cooling gallery, disposed adjacent the lower sidewall surface that is parallel with the lower sidewall surface.

8. The piston of claim 1, wherein the contoured bowl includes a swirl pocket surface disposed adjacent the bottom bowl surface that connects the lower sidewall surface to the bottom bowl surface.

9. The piston of claim 8, wherein the bottom bowl surface is flat and has a circular configuration.

10. The piston of claim 9, wherein swirl pocket surface includes a concave arcuate portion defining a lower axial extremity disposed axially below relative to the bottom bowl surface, and the body defines a first axial distance from the top squish surface to the lower axial extremity, the connecting rod attachment portion defines a cylindrical aperture defining a connecting rod pivot axis that is perpendicular to the cylindrical axis of the crown portion, the body further defines a second axial distance from the lower extremity of the concave arcuate portion to the pivot axis, and a ratio of the second axial distance to the first axial distance ranges from 1.25 to 2.5.

11. The piston of claim 10, wherein the body defines a third axial distance from the top squish surface to the bottom bowl surface and a ratio of the first axial distance to the third axial distance ranges from 1.0 to 1.4.

12. The piston of claim 11, wherein the body further includes a blend surface joining the reentrant conical surface to the lower sidewall surface, defines a maximum diameter of the bowl at the blend surface, and the ratio of the maximum diameter to the first axial distance ranges from 2.75 to 5.0.

13. The piston of claim 12, wherein the crown portion defines a crown diameter and a ratio of the crown diameter to the maximum diameter of the bowl ranges from 1.3 to 1.8.

14. A piston configured to reciprocate in the bore of an engine, the piston comprising:
   a body that includes a connecting rod attachment portion and a crown portion;
   the crown portion includes a generally cylindrical shape defining a cylindrical axis, circumferential direction and a radial direction, the crown portion further including a circular annular top squish surface with an outer circumference, a wall portion extending axially away from the squish surface proximate the outer circumference of the squish surface, defining a bottom wall surface, the crown portion further defining a contoured bowl extending axially from the top squish surface toward the interior of the body, terminating at a bottom bowl surface and the wall portion further defining a cooling gallery extending axially from the bottom wall surface toward the top squish surface; and
   wherein the contoured bowl includes a symmetrical annular shape about the cylindrical axis and further includes a lower sidewall surface and the cooling gallery includes a cooling gallery sidewall surface disposed proximate the lower sidewall surface being parallel with the lower sidewall surface and the contoured bowl includes a conical reentrant surface extending from the top squish surface forming an angle with the lower sidewall surface ranging from 110 degrees to 140 degrees.

15. The piston of claim 14, wherein the lower sidewall surface forms an acute angle with the cylindrical axis ranging from zero to 30 degrees.

16. The piston of claim 14, wherein the cooling gallery defines a cooling gallery height along a direction parallel with the cylindrical axis, the cooling gallery sidewall surface defines a cooling gallery sidewall surface curvilinear length measured in a plane containing the radial direction and the cylindrical axis along the cooling gallery sidewall surface, and a ratio of the height of the cooling gallery to the cooling gallery sidewall surface curvilinear length ranges from 1.0 to 1.9.

* * * * *